United States Patent [19]

Mihara et al.

[11] Patent Number: 5,620,239
[45] Date of Patent: Apr. 15, 1997

[54] VEHICLE MOTION CONTROL SYSTEM

[75] Inventors: Jun Mihara, Toyoake; Kenji Tozu, Yokkaichi; Yoshiyuki Yasui, Kariya; Masanobu Fukami, Hazu-gun; Takayuki Itoh; Yoshiharu Nishizawa, both of Nagoya; Akio Sakai, Chiryu, all of Japan

[73] Assignee: Aisin Seiki Kabushiki Kaisha, Kariya, Japan

[21] Appl. No.: 597,912

[22] Filed: Feb. 7, 1996

[30] Foreign Application Priority Data

Feb. 9, 1995 [JP] Japan .................................. 7-046179

[51] Int. Cl.⁶ ...................................................... B60T 8/32
[52] U.S. Cl. .......................... 303/121; 303/147; 303/160
[58] Field of Search ..................................... 303/139, 140, 303/146, 147, 121, 148, 149, 150, 160, 163, 164, 165, 167, 169, 177, 186, 199; 364/426.01, 426.02

[56] References Cited

U.S. PATENT DOCUMENTS

| 4,758,053 | 7/1988 | Yasuno ................................... 303/165 |
| 4,898,431 | 2/1990 | Karnopp et al. |
| 5,172,318 | 12/1992 | Meissner et al. |

FOREIGN PATENT DOCUMENTS

| 2-151556 | 6/1990 | Japan . |
| 3-500331 | 1/1991 | Japan . |
| 4-257757 | 9/1992 | Japan . |

Primary Examiner—Douglas C. Butler
Attorney, Agent, or Firm—Burns, Doane, Swecker & Mathis, LLP

[57] ABSTRACT

The invention is directed to a vehicle motion control system for maintaining vehicle stability by controlling the braking force applied to each wheel, in response to a condition of the vehicle in motion. A predetermined pressure increasing characteristic is provided for the hydraulic braking pressure which is supplied from a pressure control apparatus to wheel brake cylinders, on the basis of the vehicle condition, when the braking force controller initiates the control of the braking force to actuate the pressure control apparatus. And, a predetermined pressure decreasing characteristic is provided for the hydraulic braking pressure, when the braking force controller terminates the control of the braking force. The braking force controller is arranged to control the hydraulic braking pressure supplied from the pressure control apparatus to each wheel brake cylinder in accordance with the pressure increasing characteristic and the pressure decreasing characteristic to maintain the stability of the vehicle.

11 Claims, 8 Drawing Sheets

VEHICLE MOTION CONTROL SYSTEM

BACKGROUND OF THE INVENTION

1. Field of the Invention

The present invention relates to a vehicle motion control system for controlling vehicle motion, and more particularly to the control system for maintaining vehicle stability by controlling the braking force applied to each wheel of the vehicle.

2. Description of the Prior Art

Recently, a vehicle is provided with a braking force control system for controlling the braking force applied to the vehicle to perform an anti-skid control, a traction control, a front-rear braking force distribution control, and etc. In the U.S. Pat. No. 4,898,431, for example, an apparatus for controlling vehicle motion through the use of a brake controlling system which compensates for the influence of lateral forces on the vehicle. The apparatus is constituted so as to control the braking force applied to the vehicle by the braking force control system in response to comparison of a desired yaw rate with an actual yaw rate, thereby to improve the vehicle stability during the course of vehicle motion such as cornering.

According to the prior apparatus as described above, both of an increasing rate (or gradient) and a decreasing rate of the braking pressure in a wheel brake cylinder operatively connected to a wheel under control are constant. Therefore, such a problem may be caused that the vehicle motion will be varied rapidly or gradually, depending upon a coefficient of friction of a road surface or a condition of the vehicle in motion, when a vehicle stability control starts or ends. Generally, it is desired that a smooth shift from a braking pressure generated by a master cylinder in response to depression of a brake pedal by a vehicle driver, i.e., a master cylinder pressure to a braking pressure for controlling the vehicle stability, i.e., a control pressure, so as to provide a smooth initiation of the control, and its reverse shift, i.e., a smooth termination of the control shall be made. Especially, when the vehicle stability control is initiated, it is desired that the rate for shifting the master cylinder pressure into the control pressure shall be controlled in response to the coefficient of friction of the road surface, thereby to ensure an appropriate follow-up control.

Furthermore, when the vehicle stability control operation is terminated, it is important to operate the braking force control system so as to shift its output braking force smoothly into the one equal to the braking force generated by the master cylinder. If the braking force shift is not made smoothly, a pedal shock will be caused to the vehicle driver. For example, in the case where the vehicle stability control is made by the braking pressure control so as to apply a relatively large braking force to a wheel located at the front-right side of the vehicle during the vehicle stability control operation, and apply a relatively small braking force to a wheel located at the front-left side of the vehicle, if the vehicle stability control is terminated, the braking pressure applied to the front-right wheel is reduced rapidly into the braking pressure discharged from the master cylinder in response to depression of the brake pedal. Therefore, the pedal shock will be caused, and the vehicle stability control might be deteriorated. Likewise, when the vehicle stability control is initiated, the pedal shock may be caused by a rapid shift from the master cylinder pressure to the control pressure, so that the driver's feeling may be deteriorated.

SUMMARY OF THE INVENTION

Accordingly, it is an object of the present invention to provide a vehicle motion control system for initiating a vehicle motion control smoothly and terminating it smoothly.

It is another object of the present invention to provide a smooth braking operation for a transitional period from the normal braking operation to the braking force control operation at the initiation of a vehicle stability control, and vice versa at its termination.

In accomplishing the above and other objects, a vehicle motion control system is provided for controlling a braking force applied to each wheel of an automotive vehicle so as to maintain the stability of the vehicle. The system includes wheel brake cylinders which are operatively connected to the wheels for applying the braking force thereto. A pressure generator is provided for pressurizing a brake fluid in response to a brake pedal and supplying a hydraulic braking pressure to each wheel brake cylinder. A pressure control apparatus is disposed in a hydraulic circuit which communicates the pressure generator with each wheel brake cylinder to control the hydraulic braking pressure in the wheel brake cylinder. The vehicle motion control system further includes wheel speed sensors for detecting a wheel speed of each wheel respectively, braking force controller which actuates the pressure control apparatus in response to the wheel speed detected by each of the wheel speed sensors to control a braking force applied to each wheel, a vehicle condition detector for detecting a condition of the vehicle in motion, and a specific initial control unit for providing a predetermined pressure increasing characteristic for the hydraulic braking pressure supplied from the pressure control apparatus to the wheel brake cylinders on the basis of the output of the vehicle condition detector, when the braking force controller initiates the control. The braking force controller is arranged to control the hydraulic braking pressure discharged from the pressure control apparatus in accordance with the pressure increasing characteristic provided by the specific initial control unit to maintain the stability of the vehicle.

Preferably, the vehicle motion control system further includes a specific terminating control unit for providing a predetermined pressure decreasing characteristic for the hydraulic braking pressure supplied from the pressure control apparatus to the wheel brake cylinders on the basis of the output of the vehicle condition detector, when the braking force controller terminates the control, and the braking force controller is arranged to control the hydraulic braking pressure discharged from the pressure control apparatus in accordance with the pressure decreasing characteristic provided by the specific terminating control unit to maintain the stability of the vehicle.

The vehicle motion control system may include a vehicle speed estimating unit which estimates a vehicle speed of the vehicle on the basis of the wheel speed of each wheel detected by each of the wheel speed sensors, a slip rate calculating unit which calculates a wheel slip rate of each wheel on the basis of the wheel speed of each wheel detected by each of the wheel speed sensors and the estimated vehicle speed estimated by the vehicle speed estimating unit, and a coefficient of friction calculating unit which calculates a coefficient of friction of the road on which each wheel is located. The specific initial control unit may provide the predetermined pressure increasing characteristic on the basis of the result calculated by the coefficient of friction calculating unit and the result calculated by the slip rate calculating unit.

Preferably, the vehicle condition detector includes a vehicle speed estimating unit which estimates a vehicle speed of the vehicle on the basis of the wheel speeds detected by the wheel speed sensors. The specific terminating control unit may provide the predetermined pressure decreasing characteristic on the basis of the vehicle speed estimated by the vehicle speed estimating unit.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
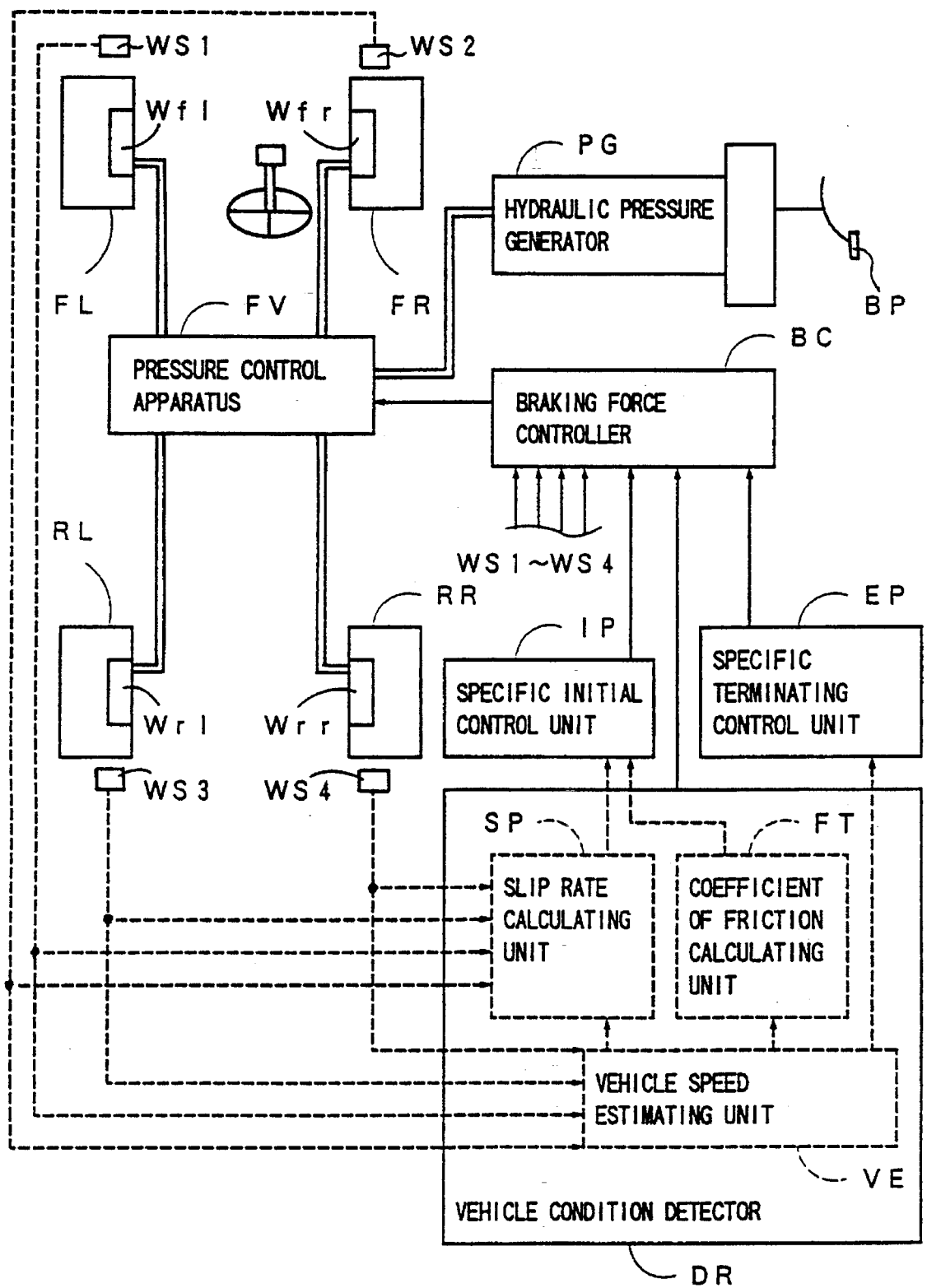
FIG.1 is a general block diagram illustrating a vehicle motion control system according to an embodiment of the present invention.

Referring to FIG.1, there is schematically illustrated a vehicle motion control system according to the present invention, which controls a braking force applied to each of wheels FL, FR, RL, RR of a vehicle individually. Wheel brake cylinders Wfl, Wfr, Wrr, Wrl are operatively connected to the wheels, respectively. A hydraulic pressure generator PG is provided for pressurizing a brake fluid in response to a brake pedal BP and supplying a hydraulic braking pressure to each wheel brake cylinder. A pressure control apparatus FV is disposed in a hydraulic circuit which communicates the hydraulic pressure generator PG with each wheel brake cylinder to control the hydraulic braking pressure therein. Wheel speed sensors WS1–WS4 are provided for detecting a wheel speed of each wheel. A braking force controller BC is arranged to actuate the pressure control apparatus FV in response to the wheel speed detected by each of the wheel speed sensors WS1–WS4 to control a braking force applied to each wheel. A vehicle condition detector DR is provided for detecting a condition of the vehicle in motion. A specific initial control unit IP is arranged to provide a predetermined pressure increasing characteristic for the hydraulic braking pressure supplied from the pressure control apparatus FV to the wheel brake cylinders, on the basis of the output of the vehicle condition detector DR, when the braking force controller BC initiates the braking force control. A specific terminating control unit EP is arranged to provide a predetermined pressure decreasing characteristic for the hydraulic braking pressure supplied from the pressure control apparatus FV to the wheel brake cylinders, on the basis of the output of the vehicle condition detector, when the braking force controller BC terminates the braking force control. The braking force controller BC is arranged to control the hydraulic braking pressure supplied from the pressure control apparatus FV to the wheel brake cylinders in accordance with the pressure increasing characteristic and the pressure decreasing characteristic which are provided by the specific initial control unit IP and the specific terminating control unit EP, respectively, to maintain the stability of the vehicle.

The vehicle condition detector DR may include a vehicle speed estimating unit VE which estimates a vehicle speed of the vehicle on the basis of the wheel speeds detected by the wheel speed sensors WS1–WS4, a slip rate calculating unit SP which calculates a wheel slip rate of each wheel on the basis of the wheel speeds detected by the wheel speed sensors WS1–WS4 and the vehicle speed estimated by the vehicle speed estimating unit VE, and a coefficient of friction calculating unit FT which calculates a coefficient of friction of the road on which each wheel is located, on the basis of the estimated vehicle speed. The specific initial control unit IP is arranged to provide the predetermined pressure increasing characteristic on the basis of the coefficient of friction calculated by the coefficient of friction calculating unit FT and the wheel slip rate calculated by the slip rate calculating unit SP, and also arranged to provide the predetermined pressure decreasing characteristic on the basis of the vehicle speed estimated by the vehicle speed estimating unit VE.

Figure 2:
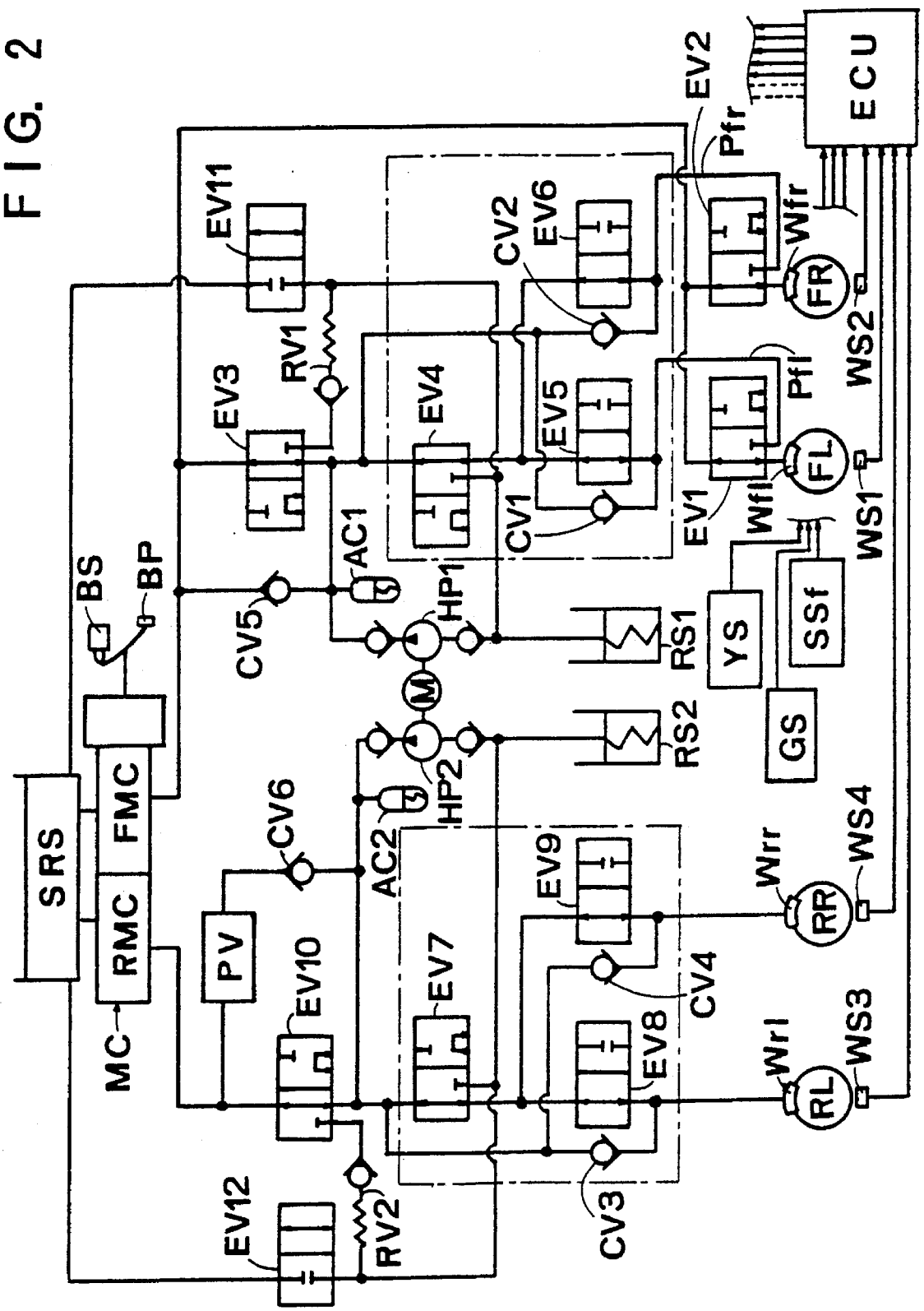
FIG.2 is a block diagram illustrating a hydraulic braking system for use in a vehicle motion control system according to an embodiment of the present invention.

Referring to FIG.2, more specifically described is the present embodiment, wherein the hydraulic pressure generator PG comprises a tandem master cylinder (hereinafter, simply referred to as a master cylinder) MC, which has a cylinder FMC for supplying the pressurized brake fluid to the front wheel brake cylinders and a cylinder RMC for supplying the pressurized brake fluid to the rear wheel brake cylinders, both of which are operated in response to depression of a brake pedal BP. Wheel brake cylinders Wfl, Wfr, Wrl, Wrr are operatively mounted on the wheels FL, FR, RL and RR, respectively. There are disposed first to sixth solenoid valves EV1–EV6 in hydraulic circuits for connecting the cylinder FMC to the front wheel brake cylinders Wfl, Wrr, respectively. The seventh to tenth solenoid valves EV7–EV10 and a proportioning valve PV are disposed in the hydraulic circuits for connecting the cylinder RMC to the rear wheel brake cylinders Wrl, Wrr. Furthermore, the eleventh and twelfth solenoid valves EV11 and EV12 are disposed in the hydraulic circuits which are connected to a low pressure reservoir SRS provided for the master cylinder MC. The above-described first to twelfth solenoid valves EV1–EV12 serve as the pressure control apparatus FV as shown in FIG.1. The wheel FL designates the wheel at the front left side as viewed from the position of a driver's seat, the wheel FR designates a wheel at the front right side, the wheel RL designates a wheel at the rear left side, and the wheel RR designates a wheel at the rear right side. In the present embodiment, a front-rear dual circuits system has been employed as shown in FIG.2, while a diagonal circuit system may be employed. A rear wheel drive system, wherein the rear wheels RL, RR are driven, is employed in this embodiment, though a front wheel drive system may be employed.

With respect to the hydraulic circuits for the front wheels, the first and second solenoid valves EV1 and EV2 are disposed respectively in the hydraulic circuits for connecting the master cylinder MC to the wheel brake cylinders Wfl, Wfr. These solenoid valves EV1 and EV2 are connected to the fifth and sixth solenoid valves EV5 and EV6 through passages Pfl and Pfr, respectively. The fifth and sixth solenoid valves EV5 and EV6 are connected together to the fourth solenoid valve EV4, and then to the third solenoid valve EV3, which is connected to the master cylinder MC. The first and second solenoid valves EV1 and EV2 are of a three-port two-position solenoid changeover valve, which is placed in the first position as shown in FIG.2 when it is not energized, through which each of the wheel brake cylinders Wfl, Wfr is communicated with the master cylinder MC. When the first and second solenoid valves EV1 and EV2 are energized, they are placed in their second positions, respectively, so that both of the wheel brake cylinders Wfl, Wfr are prevented from communicating with the master cylinder MC, and communicated with the fifth and sixth solenoid valves EV5 and EV6, respectively.

The third and fourth solenoid valves EV3 and EV4 are also of the three-port two-position solenoid changeover valve. When the third solenoid valve EV3 is not energized, it is placed in the first position, where the fourth solenoid valve EV4 is communicated with the master cylinder MC. Whereas, when the third solenoid valve EV3 is energized, it is placed in the second position, where the fourth solenoid valve EV4 is prevented from communicating with the master cylinder MC, but communicated with the low pressure reservoir SRS through the energized eleventh solenoid valve EV11. When the fourth solenoid valve EV4 is not energized, it is placed in the first position, where the third solenoid valve EV3 (and the pump HP1) is communicated with the fifth and sixth solenoid valves EV5 and EV6. When the fourth solenoid valve EV4 is energized, it is placed in the second position, where the fifth and sixth solenoid valves EV5 and EV6 are communicated with the reservoir RS1, and communicated with the low pressure reservoir SRS through the eleventh solenoid valve EV11, as well.

The fifth and sixth solenoid valves EV5 and EV6 are of a normally open two-port two-position solenoid valve, which is placed in the open position when it is not energized, while it is placed in the closed position to close the passage when it is energized. In parallel with the fourth and fifth solenoid valves EV4 and EV5, a check valve CV1 is disposed, and in parallel with the fourth and sixth solenoid valves EV4 and EV6, a check valve CV2 is disposed. The inlet side of the check valve CV1 is connected to the passage Pfl, and the inlet side of the check valve CV2 is connected to the passage Pfr. The check valve CV1 is provided for allowing the flow of the brake fluid toward the third solenoid valve EV3 and preventing the reverse flow. In the case where the third and fourth solenoid valves EV3 and EV4 are not energized, and the first solenoid valve EV1 is energized, therefore, if the brake pedal BP is released, the wheel cylinder pressure in the wheel brake cylinder Wfl is rapidly reduced into the master cylinder pressure of the master cylinder MC. The check valve CV1 is provided with an orifice (not shown) which permits gradual flow of the brake fluid from the pump HP1 to the wheel brake cylinder Wfl, even if the passage connecting therebetween is closed by the fifth solenoid valve EV5 which is provided in parallel with the check valve CV1. The check valve CV2 is provided in the same manner as the check valve CV1.

As shown in FIG.2, the pump HP1 and other components are disposed in parallel with the fourth solenoid valve EV4. The pump HP1 is driven by a motor M to discharge a brake fluid pressurized at a predetermined pressure into a passage upstream of the fourth solenoid valve EV4. The fourth solenoid valve EV4 is connected at its downstream side to the inlet side of the pump HP1 through the reservoir RS1, and connected to the eleventh solenoid valve EV11 of the normally closed two-port two-position solenoid valve. The reservoir RS1 is provided with a piston and a spring, to store the brake fluid recirculated through the fourth solenoid valve EV4 and supply the brake fluid to the pump HP1 when it operates. The eleventh solenoid valve EV11 is connected to the outlet side of the pump HP1 through a relief valve RV1 and the third solenoid valve EV3, and connected to the inlet side of the pump HP1. Therefore, when the eleventh solenoid valve EV11 is opened, if the pump HP1 is driven, the brake fluid is introduced into the pump HP1 from not only the reservoir RS1 but also the low pressure reservoir SRS, so that the pump HP1 may discharge the pressurized brake fluid sufficiently, even in the case where the brake pedal BP is not depressed. The relief valve RV1(RV2) is provided for recirculating the brake fluid from the pump HP1(HP2) to the reservoir RS1 and the low pressure reservoir SRS when the pressure of the brake fluid discharged from the pump HP1(HP2) exceeds a predetermined pressure, so that the pressure of the brake fluid discharged from the pump HP1(HP2) is regulated to the predetermined pressure.

Next, with respect to the hydraulic circuits for the rear wheels, between the master cylinder MC and the seventh solenoid valve EV7, there is disposed the tenth solenoid valve EV10, in parallel with which a proportioning pressure decrease valve PV is provided. The tenth solenoid valve EV10 is of the three-port two-position solenoid changeover valve, and placed in its first position as shown in FIG.2 when it is not energized, thereby to communicate the seventh solenoid valve EV7 with the master cylinder MC and block the communication between the seventh solenoid valve EV7 and the low pressure reservoir SRS. When the tenth solenoid valve EV10 is changed over to be placed in the second position, i.e., the energized position, the seventh solenoid valve EV7 is prevented from communicating with the master cylinder MC, and communicated with the master cylinder MC through the proportioning pressure decrease valve PV and a check valve CV6 which is described later. The proportioning pressure decrease valve PV is a valve known as a proportioning valve, which regulates the hydraulic pressure supplied to the wheel brake cylinders Wrl, Wrr by the master cylinder MC via the seventh solenoid valve EV7, so that the hydraulic pressure at its outlet side is regulated to be the same as the hydraulic pressure at its inlet side (i.e., the master cylinder pressure), until the pressure of the brake fluid discharged from the master cylinder MC is raised to reach a predetermined pressure, and regulated so as to be reduced by a predetermined rate relative to the increase of the pressure at its inlet side. In lieu of the proportioning valve PV, however, a limiting pressure valve may be employed. This valve allows the pressure at its outlet side to be the same as the pressure at its inlet side until the pressure at its outlet side is raised to reach a predetermined pressure, and prevents the pressure at its outlet side from being raised to exceed the predetermined pressure, irrespective of the increase of the pressure at its inlet side.

The seventh solenoid valve EV7 is of the three-port two-position solenoid changeover valve, and corresponds to the fourth solenoid valve EV4 of the front hydraulic circuits. That is, when the seventh solenoid valve EV7 is not energized, it is placed in the first position, where the tenth solenoid valve EV10 is communicated with the eighth and ninth solenoid valves EV8, EV9. When the seventh solenoid valve EV7 is energized, it is placed in the second position where the communication between them is blocked, and both of the eighth and ninth solenoid valves EV8, EV9 are changed over to communicate the solenoid valves EV8 and EV9 with the low pressure reservoir SRS, through the energized twelfth solenoid valve EV12. The eighth and ninth solenoid valves EV8, EV9 are of the two-port two-position solenoid valve, which is placed in the open position when it is not energized, while it is placed in the closed position to close the passage when it is energized. In parallel with the seventh and eighth solenoid valves EV7 and EV8, a check valve CV3 is disposed, and in parallel with the seventh and ninth solenoid valves EV7 and EV9, a check valve CV4 is disposed. The inlet side of the check valve CV3 is connected to the wheel brake cylinder Wrl, and the inlet side of the check valve CV4 is connected to the wheel brake cylinder Wrr. The check valves CV3 and CV4 are provided for allowing the flow of the brake fluid toward the tenth solenoid valve EV10 and preventing the reverse flow, so that if the brake pedal BP is released, the wheel cylinder pressure in the wheel brake cylinders Wrl, Wrr is rapidly reduced into the master cylinder pressure of the master cylinder MC. The check valves CV3, CV4 are provided with the same orifices (not shown) as the check valves CV1, CV2.

Furthermore, the pump HP2 and other components are disposed in parallel with the seventh solenoid valve EV7. The pump HP2 is also driven by the motor M in the same manner as the pump HP1 to discharge the brake fluid pressurized at a predetermined pressure into a passage upstream of the seventh solenoid valve EV7. The seventh solenoid valve EV7 is connected at its downstream side to the inlet side of the pump HP2 through a reservoir RS2 of the same structure as that of the reservoir RS1, and connected to the twelfth solenoid valve EV12 of the normally closed two-port two-position solenoid valve. Therefore, when the twelfth solenoid valve EV12 is opened, if the pump HP2 is driven, sufficient brake fluid is introduced into the pump HP2 from the reservoir RS2 and the low pressure reservoir SRS, even in the case where the brake pedal BP is not depressed. As shown in FIG.2, check valves are provided at both of the outlet side and inlet side of the pumps HP1, HP2. In the present embodiment, a check valve CV5 is disposed in parallel with the third solenoid valve EV3, an accumulator AC1 of a relatively small capacity is disposed at the outlet side of the pump HP1. A check valve CV6 is disposed between the proportioning valve PV and the pump HP2, and an accumulator AC2 of a relatively small capacity is disposed at the outlet side of the pump HP2. The check valves CV5 and CV6 are provided so that the brake fluid may be supplied from the master cylinder MC to the wheel brake cylinders in response to depression of the brake pedal BP, when the brake pedal BP is depressed, even in the case where the hydraulic braking pressure in the brake system is being controlled by the pumps HP1, HP2, with the third and tenth solenoid valves EV3, EV10 energized. The accumulators AC1, AC2 may be provided so as to compensate for the lack of amount discharged from the pumps HP1, HP2 after the motor M begins to rotate, and until it comes to be in its normal operating condition. In FIG.2, each frame encircled by one-dotted chain lines indicates a section for directly controlling the wheel cylinder pressure.

According to the hydraulic pressure control apparatus as described above, in the normal driving and braking conditions, all of the first to twelfth solenoid valves EV1–EV12 are not energized, so that they are placed in their first positions as shown in FIG.2. Therefore, during the normal braking operation, the master cylinder pressure is fed from the master cylinder MC to the wheel brake cylinder Wfl or Wfr through the first or second solenoid valve EV1 or EV2 in response to depression of the brake pedal BP, and fed to the wheel brake cylinder Wrl or Wrr through the tenth solenoid valve EV10, the seventh solenoid valve EV7, and the eighth or ninth solenoid valve EV8 or EV9. When the tenth solenoid valve EV10 is changed over to its second position, the master cylinder pressure is reduced by a certain rate through the proportioning valve PV to be fed to the wheel brake cylinders Wrl, Wrr.

The above-described hydraulic pressure control apparatus may provide various control modes for controlling the stability of the vehicle, such as a steering control by braking, anti-skid control, and other various kinds of braking force control. For example, in the case where the braking force control is made with respect to the front wheel FL, the first and third solenoid valves EV1 and EV3 are energized, and the motor M is driven to discharge the pressurized fluid. In this case, if the fourth and fifth solenoid valves EV4 and EV5 are not energized, the wheel brake cylinder Wfl is not communicated with the master cylinder MC, but communicated with the accumulator AC1 and the pump HP1, so that the pressurized brake fluid is supplied therefrom directly to the wheel brake cylinder Wfl to increase the pressure therein. On the contrary, if the fifth solenoid valve EV5 is not energized, but the fourth and eleventh solenoid valves EV4 and EV11 are energized, then the brake fluid in the wheel brake cylinder Wfl is drained into the reservoir RS1 through the first, fifth and fourth solenoid valves EV1, EV5 and EV4, and also drained into the low pressure reservoir SRS through the eleventh solenoid valve EV11, so that the pressure in the wheel brake cylinder Wfl is reduced.

When the fifth solenoid valve EV5 is energized, it is closed to block the pressurized brake fluid from being supplied from the pump HP1, but the pressurized brake fluid is fed to the wheel brake cylinder Wfl through the orifice of the check valve CV1 and the first solenoid valve EV1, so that the pressure in the wheel brake cylinder Wfl is gradually increased (i.e., a gradual pressure increasing operation). When the braking force control is being made with respect to the wheels FL, FR, if the pressure in the wheel brake cylinder of one wheel, e.g., the wheel FL, is being decreased, the pressure in the wheel brake cylinder of the other one, e.g., the wheel FR can not be increased, so that a gradual pressure increase mode is selected for the requirement of increasing the pressure in the wheel brake cylinder of the wheel FR. Thus, with the operation for increasing and decreasing the pressure repeated, an appropriate braking force may be applied to the wheel to be controlled. The wheel FR is controlled in the same manner as described above.

In order to control the braking force of the rear wheel RL, the tenth solenoid valve EV10 is energized, and the motor M is driven to discharge the pressurized brake fluid from the pump HP2. In this case, if the seventh and eighth solenoid valves EV7 and EV8 are not energized, the pressurized brake fluid discharged from the accumulator AC2 and the pump HP2 are directly supplied to the wheel brake cylinder Wrl to increase the pressure therein. And, if the seventh and the twelfth solenoid valve EV7 and EV12 are energized, the brake fluid in the wheel brake cylinder Wrl is drained into the reservoir RS2 through the eighth and seventh solenoid valves EV8 and EV7, and drained into the low pressure reservoir SRS through the twelfth solenoid valve EV12, so that the pressure in the wheel brake cylinder Wrl is decreased. Whereas, if the eighth solenoid valve EV8 is energized, it is closed to block the pressurized brake fluid from being supplied from the accumulator AC2 and the pump HP2, but the pressurized brake fluid is fed to the wheel brake cylinder Wrl through the orifice of the check valve CV3 to gradually increase the pressure in the wheel brake cylinder Wrl. When the braking force control is being made with respect to the wheels RL, RR, if the pressure in the wheel brake cylinder of one wheel, e.g., the wheel RL, is being decreased, the pressure in the wheel brake cylinder of the other one, e.g., the wheel RR can not be increased, so that the gradual pressure increase mode is selected for the requirement of increasing the pressure in the wheel brake cylinder of the wheel RR. The wheel RR is controlled in the same manner as described above.

Figure 3:
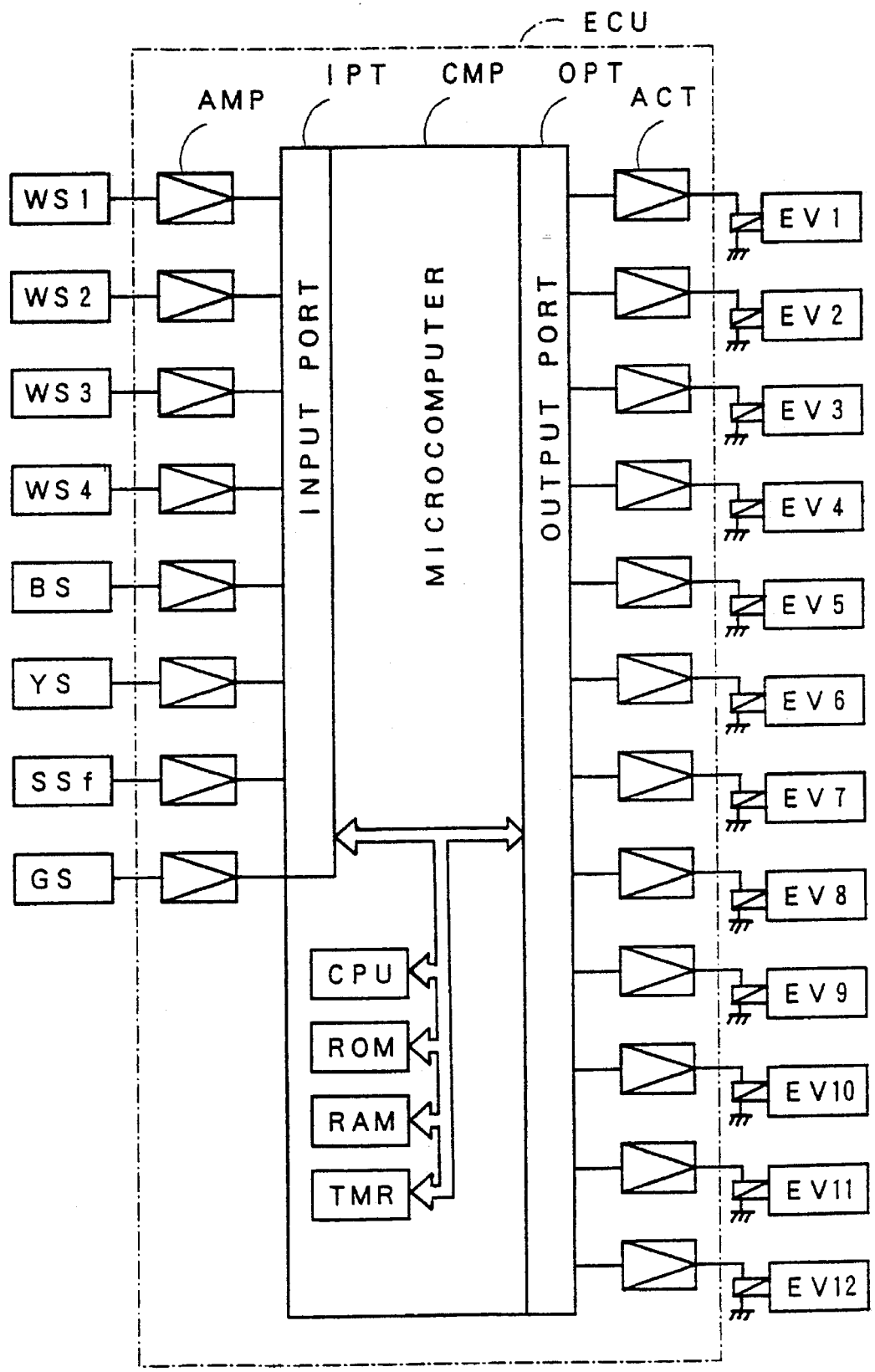
FIG.3 is a block diagram illustrating the arrangement of the electronic controller as shown in FIG.1.

The above-described solenoid valves EV1 to EV12 are electrically connected to the electronic controller ECU as shown in FIG.3 which controls the operation of those solenoid valves. An electric motor (not shown) for driving the pumps HP1, HP2 is also electrically connected to the electronic controller ECU, so that the operation of the electric motor is controlled by the electronic controller ECU. At the wheels FL, FR, RL and RR as shown in FIG.2, there are provided wheel speed sensors WS1 to WS4 respectively, which are electrically connected to the electronic controller ECU, and by each of which a signal corresponding to a rotational speed of each road wheel, i.e., a pulse signal with number of pulses proportional to each wheel speed is fed to the electronic controller ECU. There are also provided a brake switch BS which turns on when the brake pedal BP is depressed, and turns off when the brake pedal BP is released, a front steering angle sensor SSf for detecting a steering angle Af of the front wheels FL, FR, a yaw rate sensor YS for detecting a yaw rate of the vehicle, and a lateral acceleration sensor GS for detecting the vehicle lateral acceleration, and these are electrically connected to the electronic controller ECU. According to the yaw rate sensor YS, a varying rate of rotational angle of the vehicle about a vertical line on the center of gravity of the vehicle, i.e., a yaw angular velocity or yaw rate Yr is detected and fed to the electronic controller ECU. The yaw rate Yr may be calculated on the basis of the wheel speed differential between non-driven wheels (the front wheels FL and FR in the present embodiment), so that the yaw rate sensor YS may be omitted to reduce in cost.

As shown in FIG.3, the electronic controller ECU is provided with a one-chip microcomputer CMP, which includes a central processing unit or CPU, a read-only memory or ROM, a random access memory or RAM, an input port IPT, an output port OPT and etc. The signals detected by each of the wheel speed sensors WS1 to WS4, brake switch BS, front steering angle sensor SSf, yaw rate sensor YS and lateral acceleration sensor GS are fed to the input port IPT via respective amplification circuits AMP and then to the CPU. Then, control signals are fed from the output port OPT to the first to twelfth solenoid valves EV1–EV12 via the respective drive circuits ACT. In the microcomputer CMP, the ROM memorizes a program corresponding to flowcharts shown in FIGS.4 to 6, the CPU executes the program while the ignition switch (not shown) is closed, and the RAM temporarily memorizes variable data needed to execute the program.

Figure 4:
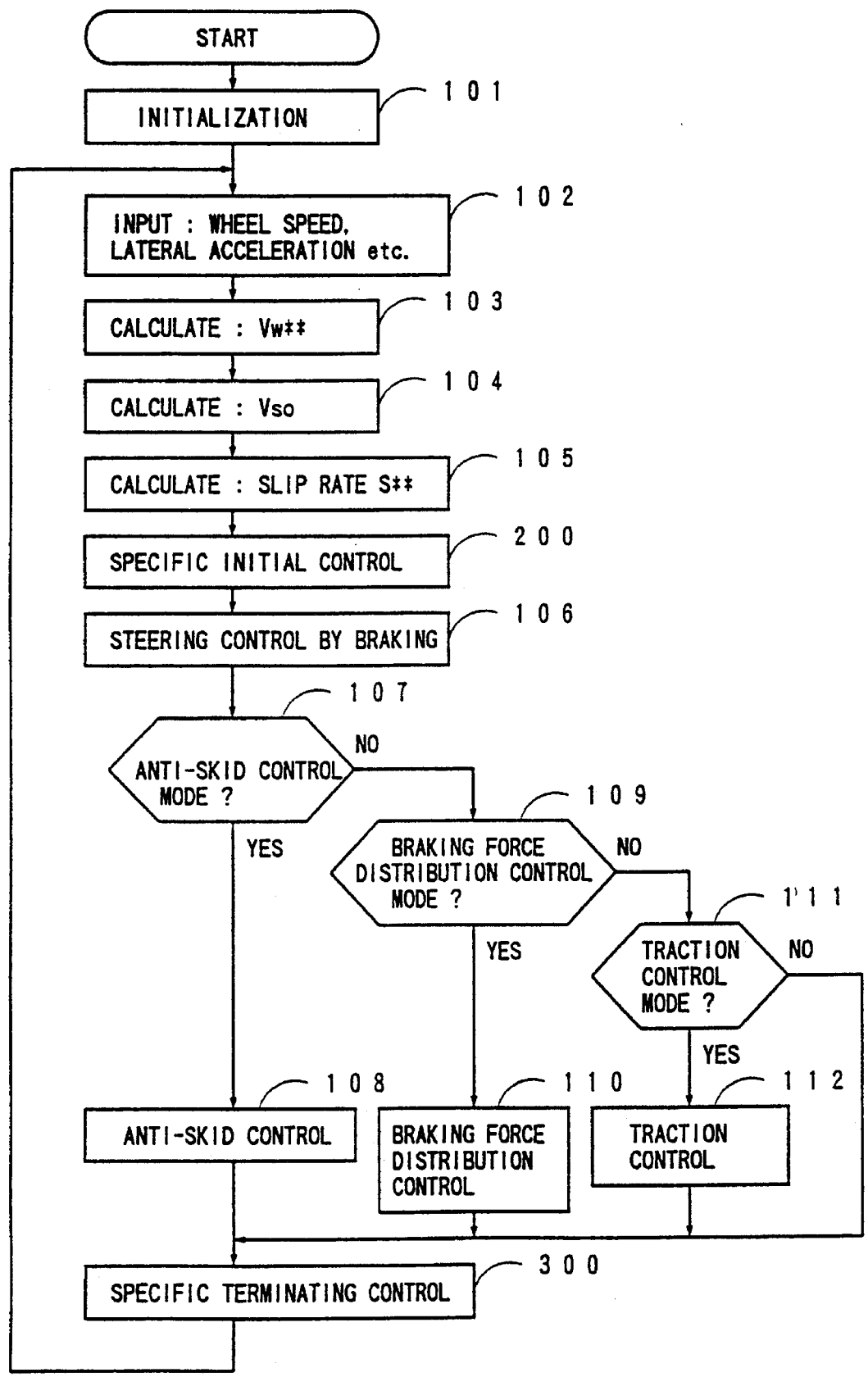
FIG.4 is a flowchart showing the operation of the vehicle motion control according to an embodiment of the present invention.

The program routine executed by the electronic controller ECU for the steering control by braking, the anti-skid control and other controls will now be described with reference to FIGS.4 to 6. FIG.4 is a flowchart showing a main routine of the vehicle motion control for maintaining its stability to be executed in accordance with a program of one embodiment of the present invention. The program routine corresponding to the flowchart as shown in FIG.4 starts when the ignition switch (not shown) turns on, and provides for initialization of the system at Step 101 to clear various data. Then, the program proceeds to Step 102 where the signals detected by the wheel speed sensors WS1–WS4 are input, and the signal (steering angle Af) detected by the front steering angle sensor SSf, the signal (yaw rate Yr) detected by the yaw rate sensor YS, and the signal (actual lateral acceleration Gy) detected by the lateral acceleration sensor GS are input, respectively. Then, the program proceeds to Step 103 where the wheel speed $Vw^{}$ ($$ represents one of the wheels FL, FR, RL, RR) of each wheel is calculated, and an estimated vehicle speed Vso is calculated on the basis of the wheel speed $Vw^{}$ at Step 104. The estimated vehicle speed Vso may be the same as that provided for the conventional anti-skid control. Next, at Step 105, a wheel slip rate $S^{}$ is calculated on the basis of the wheel speed $Vw^{**}$ of each wheel and the estimated vehicle speed Vso calculated at Steps 103 and 104, as follows:

$$S^{}=(Vso-Vw^{})/Vso$$

Then, the program proceeds to Step 200 where a specific initial control for providing initial pressure (explained later in detail) is performed, and then to Step 106 where the steering control by braking is performed to achieve the vehicle stability control. That is, the braking force applied to each wheel is controlled, with the aforementioned solenoid valves energized or de-energized in response to the condition of the vehicle in motion. A specific control for providing initial pressure, i.e., specific initial control shall be performed before the steering control by braking starts, and performed before the traction control starts, but it shall be terminated immediately when the anti-skid control starts. Then, the program proceeds to Step 107, where it is determined whether the condition for initiating the anti-skid control operation is fulfilled or not. If it is determined that the condition is fulfilled to be in the anti-skid control mode, the specific initial control is terminated immediately at Step 108, where the anti-skid control starts.

If it is determined at Step 107 that the condition for initiating the anti-skid control operation is not fulfilled, then the program proceeds to Step 109 where it is determined whether the condition for initiating the braking force distribution control is fulfilled or not. If it is affirmative at Step 109, the program further proceeds to Step 110 where the braking force distribution control is performed, otherwise it proceeds to Step 111, where it is determined whether the condition for initiating the traction control is fulfilled or not.

If the condition for initiating the traction control is fulfilled, the program proceeds to Step 112 where the traction control is performed. Otherwise, the program proceeds to Step 300 where a specific terminating control is performed, and then the program returns to Step 102. After the respective control is performed at Steps 108, 110, 112, the program proceeds to Step 300, and then returns to Step 102. At Step 112, the sub-throttle opening angle for the throttle control apparatus (not shown) may be adjusted in response to the condition of the vehicle in motion, so that the output of the engine (not shown) will be reduced to limit the driving force produced thereby. In addition to the braking force control and the driving force control, may be provided a steering angle control for rear wheels, by which the steering angle of the rear wheels RL, RR may be controlled in response to the condition of the vehicle in motion.

Figure 5:
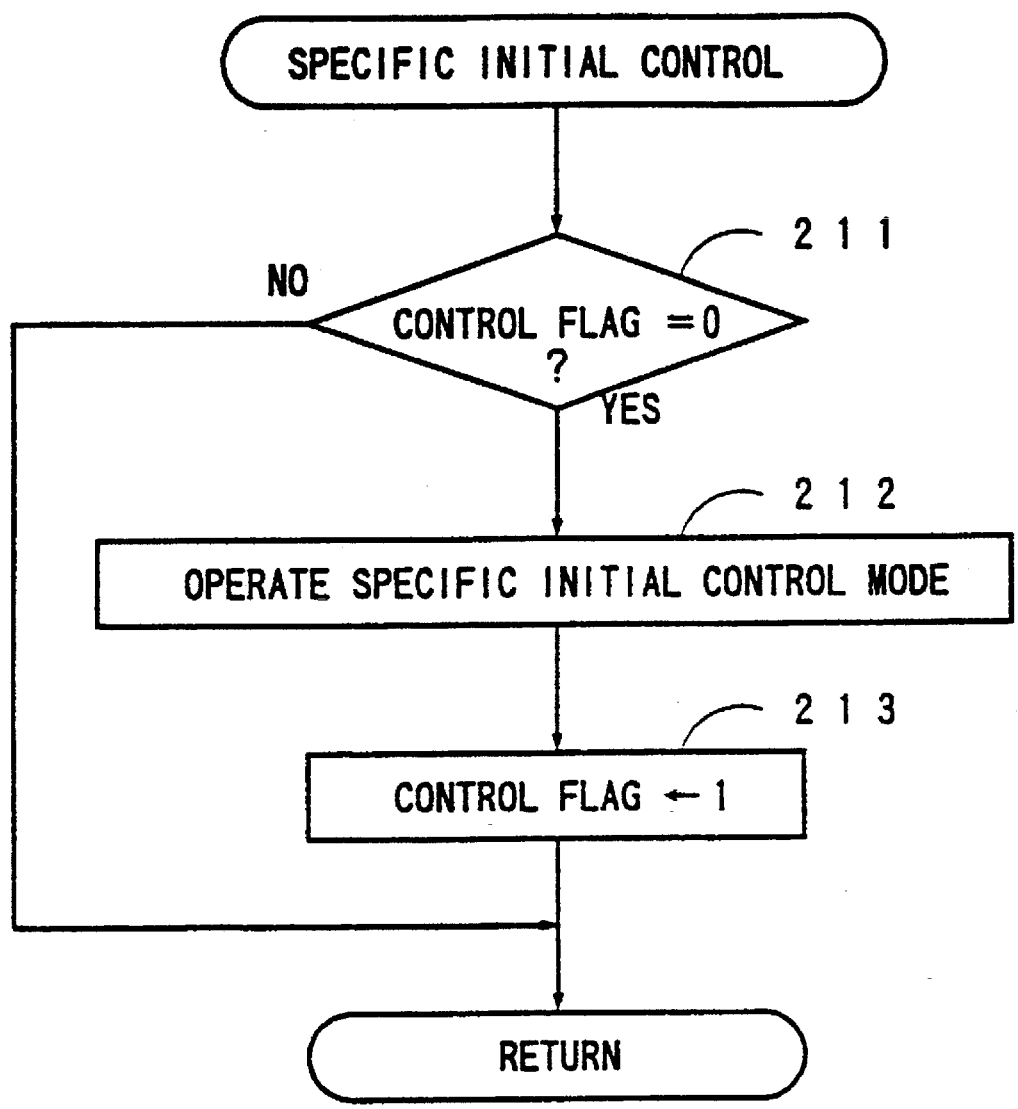
FIG.5 is a flowchart showing the operation of the specific control for initiating the vehicle motion control according to an embodiment of the present invention.

FIG.5 shows a subroutine of Step 200 in FIG.4 for the specific initial control. At Step 211, it is determined whether a control flag which represents completion of the specific initial control has been set (1) or not. If the control flag has been set, the program returns to the main routine in FIG.4. If the control flag has been reset to be zero (0), i.e., before the specific initial control starts, or when it is being performed, then the program proceeds to Step 212, where the operation of the specific initial control mode for providing the initial pressure is executed, and it proceeds to Step 213 where the control flag is set, and then returns to the main routine.

Figure 7:
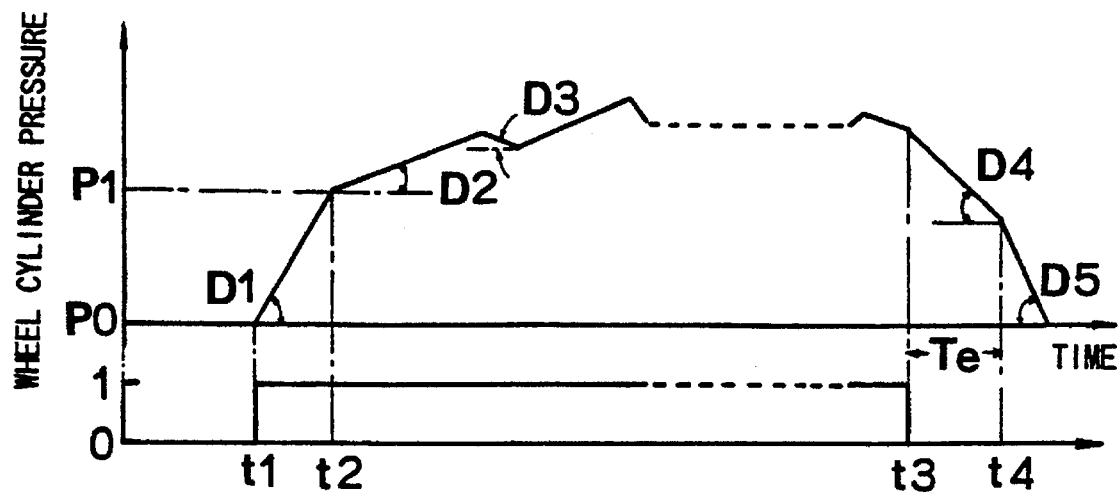
FIG.7 is a diagram showing variations of hydraulic braking pressure in a wheel brake cylinder according to an embodiment of the present invention.
Figure 8:
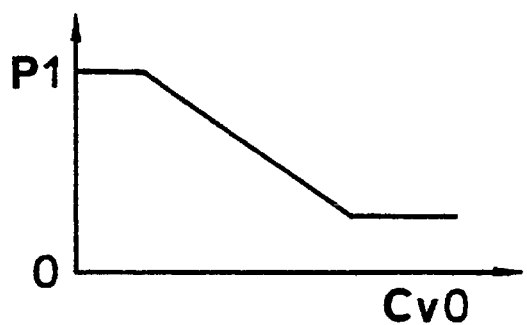
FIG.8 is a diagram showing a relationship between an initial pressure and a reference value provided on the basis of a wheel slip rate according to an embodiment of the present invention.
Figure 9:
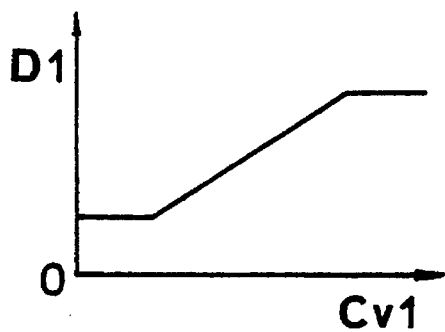
FIG.9 is a diagram showing a relationship between the increasing rate of the wheel cylinder pressure and a reference value representing a vehicle condition according to an embodiment of the present invention.

At Step 212, an initial pressure P1 is provided in accordance with a map as shown in FIG.8. In accordance with a map as shown in FIG.9, is provided such a characteristic of the hydraulic braking pressure that varies from the wheel cylinder pressure P0 which is provided when the pressure control (t1 in FIG.7) starts, up to the initial pressure P1 which is provided later (t2 in FIG.7), with an increasing rate of a gradient D1. That is, the initial pressure P1 of the wheel brake cylinder of the wheel to be controlled is determined in response to a reference value Cv0 which is provided on the abscissa in FIG.8, to provide a rapid pressure increasing operation. More specifically, the initial pressure P1 is sub-proportional to the reference value Cv0 in a certain range as shown in FIG.8, while the gradient D1 is proportional to a reference value Cv1 in a certain range as shown in FIG.9. Thus, the rapid pressure increasing time is controlled to reach the initial pressure P1, so that the hydraulic pressure in the wheel brake cylinder is increased rapidly until it reaches a threshold value just below the value which may cause the wheel to be locked. In this case, the reference value Cv0 is a value of the wheel slip rate S** which is weighed by a vehicle acceleration DVso (a differential of the estimated vehicle speed Vso). That is, the reference value Cv0 is calculated by a formula as follows:

$$Cv0 = S** + K1 \times DVso$$

where "Ki" represents a constant, and "×" indicates multiplication. The pressure increasing gradient D1 is determined on the basis of the reference value Cv1 which is provided on the abscissa in FIG.9. The reference value Cv1 is calculated according to a formula as follows:

$$Cv1 = CF \times Fz$$

where "CF" represents a coefficient of friction between a tire and a road surface, "Fz" represents a load applied to the tire. The coefficient of friction "CF" may be calculated as follows:

$$CF = (Gx^2 + Gy^2)^{1/2}$$

where "Gx" represents a longitudinal acceleration which may be calculated from the estimated vehicle speed Vso to be its differential value DVso. When the vehicle is moving straight, the lateral acceleration Gy is zero, so that the acceleration DVso may be used for the coefficient of friction CF as an approximate value thereof.

Figure 10:
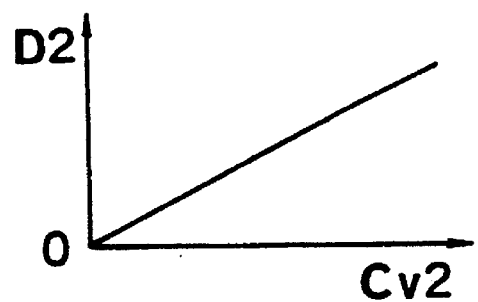
FIG.10 is a diagram showing a relationship between the increasing rate of the wheel cylinder pressure and the reference value representing the vehicle condition according to an embodiment of the present invention.
Figure 11:
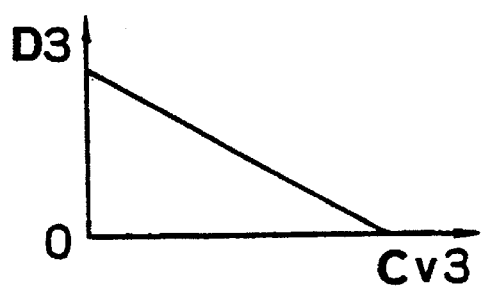
FIG.11 is a diagram showing a relationship between a decreasing rate of the wheel cylinder pressure and the reference value representing the vehicle condition according to an embodiment of the present invention.

After the wheel cylinder pressure has reached to the initial pressure P1, the program proceeds to the steps following Step 106 as shown in FIG.4, where a pressure increasing gradient D2 and a pressure decreasing gradient D3 are provided according to the maps as shown in FIGS. 10 and 11. The reference values Cv2 and Cv3 which are provided on the abscissa in those figures may be selected from any values of those which represent the condition of the vehicle in motion, such as the yaw rate Yr, yaw acceleration dYr/dt, vehicle side slip angle Ab, vehicle side slip angular velocity dAb/dt, estimated vehicle speed Vso, vehicle acceleration dVso/dt, lateral acceleration Gy, coefficient of friction CF, or various combinations of them.

Figure 6:
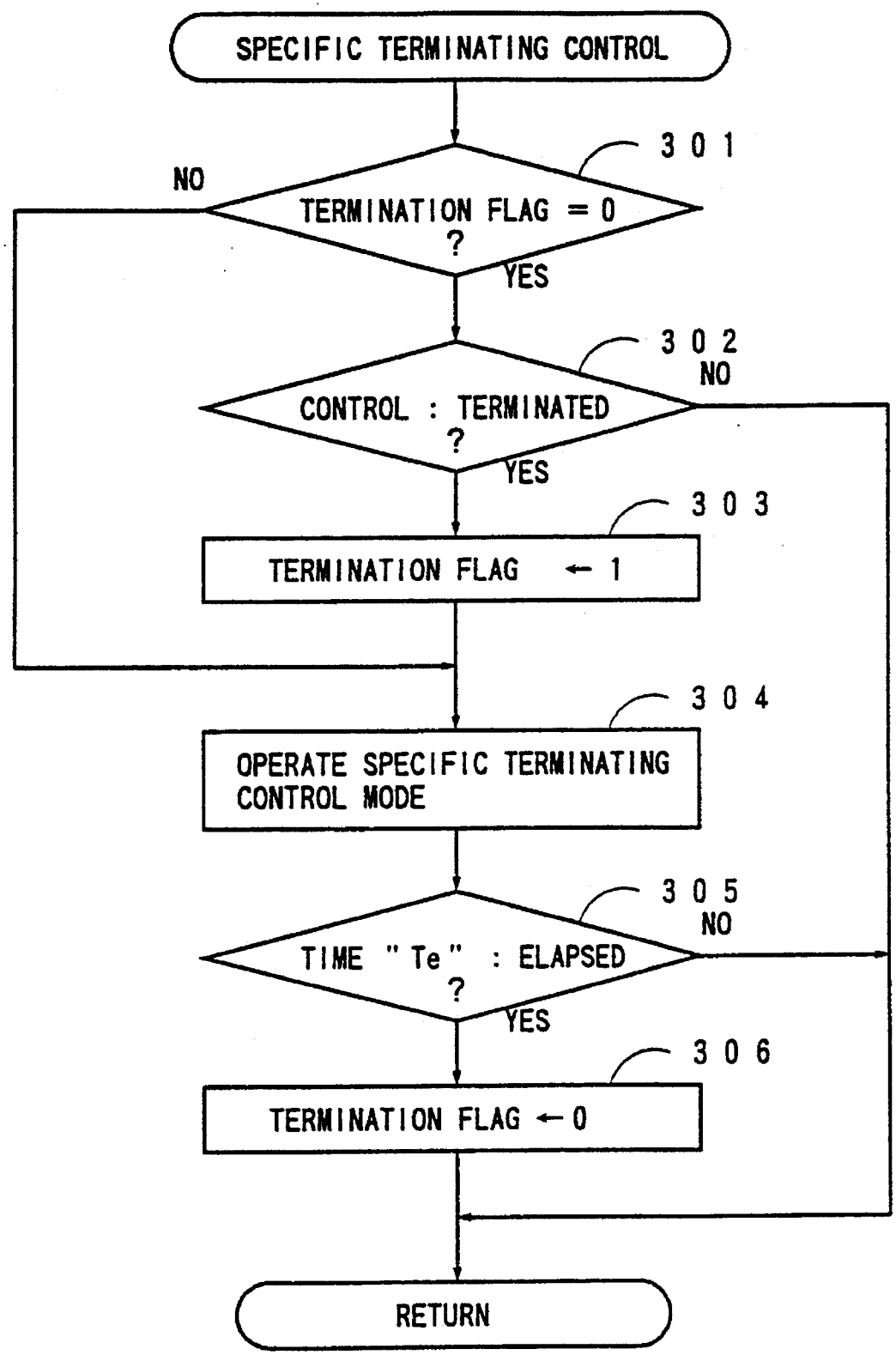
FIG.6 is a flowchart showing the operation of the specific control for terminating the vehicle motion control according to an embodiment of the present invention.
Figure 12:
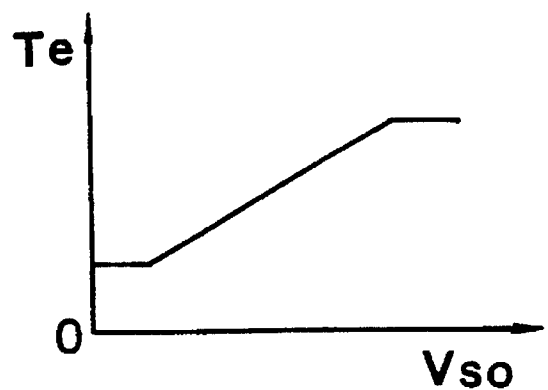
FIG.12 is a diagram showing a relationship between the estimated vehicle speed and the time for decreasing the wheel cylinder pressure according to an embodiment of the present invention.

When the pressure control is terminated (t3 in FIG.7), i.e., when each control mode such as the anti-skid control is terminated, the specific terminating control is provided at Step 300 according to the flowchart as shown in FIG.6. At Step 301 in FIG.6, it is determined whether a termination flag which indicates the specific terminating control is being performed, has been set, or not. If it is determined that the termination flag is set, the program proceeds to Step 304, otherwise it is further determined at Step 302 if the condition for terminating the control has been fulfilled or not. When it is determined that the condition for terminating the control has been fulfilled, the program proceeds to Step 303 where the termination flag is set (1), and then to Step 304 where operation of the specific terminating control mode is performed. In practice, a pulse pressure decreasing control, or gradual pressure decreasing control is performed at Step 304 for a predetermined period of time "Te", so as to provide a pressure decreasing gradient D4 as shown in FIG.7. The time "Te" is determined on the basis of the estimated vehicle speed Vso according to a map, wherein the time "Te" is proportional to the estimated vehicle speed Vso in a certain range as shown in FIG.12. That is, the wheel cylinder pressure under the steering control by braking, for example, is controlled so as to be equalized with the pressure in the normal condition, with a rate provided in response to the estimated vehicle speed Vso. Thereafter, if it is determined at Step 305 that the time "Te" has been elapsed, the termination flag is reset at Step 306. Accordingly, after the time "Te" is elapsed at "t4" as shown in FIG.7, the wheel cylinder pressure is decreased in accordance with a pressure decreasing gradient D5, which is determined automatically by orifices in the valves or the like, thereby to be equalized with the wheel cylinder pressure P0, i.e., the value before the control.

What is claimed is:

1. A vehicle motion control system for maintaining stability of an automotive vehicle when said vehicle in motion, by controlling a braking force applied to wheels of said vehicle, comprising:

wheel brake cylinders operatively connected to said wheels for applying the braking force thereto;

pressure generating means for pressurizing a brake fluid in response to depression of a brake pedal and supplying a hydraulic braking pressure to each of said wheel brake cylinders;

pressure control means disposed in a hydraulic circuit communicating said pressure generating means with each of said wheel brake cylinders for controlling the hydraulic braking pressure in each of said wheel brake cylinders;

wheel speed detecting means for detecting a wheel speed of each of said wheels;

braking force control means for actuating said pressure control means in response to the wheel speed detected by said wheel speed detecting means to control the braking force applied to each of said wheels;

vehicle condition detecting means for detecting a condition of said vehicle in motion; and specific initial control means for providing a predetermined pressure increasing characteristic for the hydraulic braking pressure discharged from said pressure control means on the basis of the output of said vehicle condition detecting means, when said braking force control means initiates the control of the braking force, said braking force control means controlling the hydraulic braking pressure supplied from said pressure control means to said wheel brake cylinders in accordance with the pressure increasing characteristic provided by said specific initial control means to maintain the stability of said vehicle.

2. A vehicle motion control system as set forth in claim 1, wherein said vehicle condition detecting means includes;

vehicle speed estimating means for estimating a vehicle speed of said vehicle on the basis of the wheel speed of each wheel detected by said wheel speed detecting means;

slip rate calculating means for calculating a wheel slip rate of each wheel on the basis of the wheel speed of each wheel detected by said wheel speed detecting means and the vehicle speed estimated by said vehicle speed estimating means; and coefficient of friction calculating means for calculating a coefficient of friction of the road on which each of said wheels is located, and wherein said specific initial control means provides said predetermined pressure increasing characteristic on the basis of the coefficient of friction calculated by said coefficient of friction calculating means and the wheel slip rate calculated by said slip rate calculating means.

3. A vehicle motion control system as set forth in claim 2, wherein said specific initial control means provides an initial braking pressure in response to a first reference value which is calculated on the basis of said wheel slip rate and said estimated vehicle speed, and wherein said specific initial control means provides an increasing rate of the hydraulic braking pressure up to said initial braking pressure in response to a second reference value which is calculated on the basis of said coefficient of friction.

4. A vehicle motion control system as set forth in claim 3, wherein said specific initial control means provides said predetermined pressure increasing characteristic with said initial braking pressure being sub-proportional to said first reference value in a certain range.

5. A vehicle motion control system as set forth in claim 4, wherein said first reference value is sum of said wheel slip rate and a vehicle acceleration multiplied by a constant value, said vehicle acceleration being calculated from said estimated vehicle speed.

6. A vehicle motion control system as set forth in claim 3, wherein said specific initial control means provides said predetermined pressure increasing characteristic with said increasing rate being proportional to said second reference value in a certain range.

7. A vehicle motion control system as set forth in claim 1, further comprising specific terminating control means for providing a predetermined pressure decreasing characteristic for the hydraulic braking pressure discharged from said pressure control means on the basis of the output of said vehicle condition detecting means, when said braking force control means terminates the control of the braking force, said braking force control means controlling the hydraulic braking pressure supplied from said pressure control means to said wheel brake cylinders in accordance with the pressure decreasing characteristic provided by said specific terminating control means to maintain the stability of said vehicle.

8. A vehicle motion control system as set forth in claim 7, wherein said vehicle condition detecting means includes vehicle speed estimating means for estimating a vehicle speed of said vehicle on the basis of the wheel speed detected by said wheel speed detecting means, and wherein said specific terminating control means provides said predetermined pressure decreasing characteristic on the basis of the vehicle speed estimated by said vehicle speed estimating means.

9. A vehicle motion control system as set forth in claim 8, wherein said specific terminating control means provides said predetermined pressure decreasing characteristic for a predetermined period of time after said braking force control means began to terminate the control of the braking force.

10. A vehicle motion control system as set forth in claim 9, wherein said specific terminating control means provides said predetermined period of time on the basis of said estimated vehicle speed.

11. A vehicle motion control system as set forth in claim 10, wherein said specific terminating control means provides said predetermined period of time to be proportional to said estimated vehicle speed in a certain range.

* * * * *